United States Patent
Takada et al.

(10) Patent No.: US 9,473,056 B2
(45) Date of Patent: Oct. 18, 2016

(54) MOTOR CONTROL DEVICE AND CONTROL METHOD OF STEPPING MOTOR

(71) Applicant: MINEBEA CO., LTD., Kitasaku-gun, Nagano (JP)

(72) Inventors: Kazuo Takada, Kosai (JP); Takayuki Matsui, Toyohashi (JP); Scott Jacobs, Novi, MI (US); Hidetoshi Hijikata, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 105 days.

(21) Appl. No.: 14/088,563

(22) Filed: Nov. 25, 2013

(65) Prior Publication Data

US 2014/0176039 A1    Jun. 26, 2014

(30) Foreign Application Priority Data

Dec. 25, 2012   (JP) ................. 2012-281396

(51) Int. Cl.
| | | |
|---|---|---|
| H02P 6/08 | (2006.01) | |
| H02P 6/18 | (2006.01) | |
| H02P 6/34 | (2016.01) | |
| H02P 8/38 | (2006.01) | |

(52) U.S. Cl.
CPC ..................... H02P 8/38 (2013.01)

(58) Field of Classification Search
CPC ............ H02P 8/38; H02P 6/182; H02P 8/12; H02P 8/14
See application file for complete search history.

(56) References Cited

U.S. PATENT DOCUMENTS

| | | | | |
|---|---|---|---|---|
| 4,147,968 A | * | 4/1979 | Goble .................. | G05D 3/18 318/685 |
| 5,424,960 A | * | 6/1995 | Watanabe ........... | G01R 31/343 318/696 |
| 5,616,075 A | * | 4/1997 | Winstanley ........... | G07D 1/00 194/200 |
| 8,629,643 B2 | * | 1/2014 | Tachibana .......... | G03G 15/5004 318/400.42 |
| 2008/0100249 A1 | * | 5/2008 | Coutu ................ | H02P 8/32 318/561 |
| 2009/0016172 A1 | * | 1/2009 | Fujii ................... | G04C 3/14 368/80 |
| 2009/0206788 A1 | * | 8/2009 | Ando ................... | H02P 8/32 318/696 |

(Continued)

FOREIGN PATENT DOCUMENTS

| | | |
|---|---|---|
| EP | 1 650 571 A1 | 4/2006 |
| JP | H02-122966 A | 5/1990 |

(Continued)

OTHER PUBLICATIONS

Office Action issued in the corresponding Japanese Patent Application 2012-281396, dispatched on Oct. 20, 2015.

*Primary Examiner* — Bentsu Ro
*Assistant Examiner* — Charles S Laughlin
(74) *Attorney, Agent, or Firm* — Carrier Blackman & Associates, P.C.; Joseph P. Carrier; Anne G. Sabourin (57) ABSTRACT

There is provided a motor control device controlling an energizing state of a coil of each phase for driving a stepping motor having multiple phase coils. The motor control device includes a detecting unit configured to detect whether the stepping motor is out of step, and a reverse rotating unit configured, when the detecting unit detects that the stepping motor is out of step, to rotate the stepping motor in a second rotation direction reverse to a first rotation direction, which is a rotation direction of the stepping motor before detecting out-of-step, by a number of steps with which a stress received by the stepping motor is alleviated, before the stepping motor spontaneously rotates in the second direction.

11 Claims, 7 Drawing Sheets

(56) References Cited

U.S. PATENT DOCUMENTS

2009/0256515 A1* 10/2009 Takada .................. H02P 8/38
                                                        318/696
2010/0181398 A1* 7/2010 Davis ............... B02C 18/0007
                                                        241/36
2011/0042404 A1* 2/2011 Koike ................. G07F 9/026
                                                        221/2

FOREIGN PATENT DOCUMENTS

| JP | H08-066093 A | 3/1996 |
| JP | 2000-165599 A | 6/2000 |
| JP | 2002-199794 A | 7/2002 |
| JP | 2006-064437 A | 3/2006 |
| JP | 2007-215271 A | 8/2007 |
| JP | 2008-141868 A | 6/2008 |

* cited by examiner

| TEMPERATURE | EQUAL TO OR LOWER THAN 5°C | HIGHER THAN 5°C AND LOWR THAN 75°C | EQUAL TO OR HIGHER THAN 75°C |
| --- | --- | --- | --- |
| THRESHOLD VALUE Va | Va1 | Va2 | Va3 |
| THRESHOLD VALUE Vb | Vb1 | Vb2 | Vb3 |
| THRESHOLD VALUE Vc | Vc1 | Vc2 | Vc3 |

MOTOR CONTROL DEVICE AND CONTROL METHOD OF STEPPING MOTOR

BACKGROUND OF THE INVENTION

1. Field of the Invention

The present invention relates to a motor control device and a control method of a stepping motor, and particularly, to a motor control device and a control method of a stepping motor which measure a back electromotive voltage to detect out-of-step.

2. Description of the Related Art

A stepping motor has various features, for example, the stepping motor is easily controlled, and is widely used for various actuators, and the like. The stepping motor includes a stator and a rotor which have no contact with each other, and thus has a long life. Also, large static torque is obtained when the stepping motor is in an excited state.

In the stepping motor, so-called out-of-step may occur, and occurrence of out-of-step may cause a problem. If the stepping motor becomes out of step, the rotor may not normally rotate, resulting in the uncontrollable state. Out-of-step may be caused by loss of synchronization between an input pulse signal and rotation of a motor, for example, when an excessive load greater than a driving torque of the motor is applied or when a rapid speed change occurs.

In general, the stepping motor is used for controlling an angle and speed of rotation with a high degree of accuracy. Since the stepping motor manages its rotational position according to the number of pulses oscillated from a control side, if detection of out-of-step is delayed and only control proceeds, a driving object such as a position of a gear may deviate. Also, if detection of out-of-step is delayed, acoustic noise may be caused. Therefore, in order to perform an appropriate operation in the actuator or the like using the stepping motor, it is required to quickly detect occurrence of out-of-step.

That is, when the stepping motor becomes out of step, it is necessary to quickly detect out-of-step, and quickly perform error processing such as stopping rotation or returning to a normal rotation state. Therefore, in the stepping motor, a circuit or a system for detecting out-of-step and then performing error processing is often used.

Incidentally, the following technique related to an apparatuses using a stepping motor has been disclosed. JP-A-2007-215271 discloses a technique for performing control so as to prevent superfluous driving pulse signals from being fed into a stepping motor in an initialization operation when driving of the stepping motor is controlled without using a rotational position sensor or the like. That is, when the initialization operation is performed, the stepping motor is driven in a predetermined rotation direction, and an induced voltage generated between winding wires of non-excitation phases is compared with a predetermined reference voltage, whereby a rotation state of the motor is detected. If it is detected that the motor is locked, control is performed such that the motor rotates reversely by a predetermined number of pluses based on a predetermined driving pulse signal.

JP-A-2002-199794 discloses a technique for rotating a stepping motor used in a recorder reversely if out-of-step is detected, as a method of restoring rotation of the motor when out-of-step of the motor is detected.

This process is performed for grasping a leading end of a paper sheet missed due to the out-of-step. Further, JP-A-2002-199794 also discloses a technique for rotating the motor while gradually reducing the rotation speed to prevent out-of-step when performing forward rotation after the reverse rotation.

SUMMARY OF THE INVENTION

In the meantime, when the stepping motor is used in the actuator having an end stop, if the motor reaches the end stop in the middle of moving in a certain direction, a motor control device detects out-of-step of the motor. If out-of-step is detected as described above, the motor control device generally performs control so as to stop the motor. Accordingly, the actuator can be held at an end stop position.

However, even if the actuator is configured to be held at the end stop position as described above, there may be a problem that the actuator may spontaneously move in a direction away from the end stop. In other words, there may be a problem that the actuator may not be held at the end stop position, which causes the actuator to be uncontrollable.

This problem may occur, for example, as follows. That is, immediately before the actuator reaches the end stop so as to be stopped, due to a torque applied by the motor, a strain (a repulsive force to act reversely) is generated inside the actuator. If the motor is stopped in a state where the strain has been generated as described above, the motor cannot withstand the repulsive force generated by the strain, and thus rotates in a direction in which the repulsive force is alleviated (released). As a result, the actuator moves in a direction away from the end stop (the reverse direction).

If this problem occurs, the following defects would be caused. That is, when the motor control device controls the stepping motor, the motor control device uses a distance to a target position as the number of control steps to perform position management. Therefore, if the position management becomes deviated, the motor moves to a position deviated from an original target position. Since the actuator using the stepping motor generally does not use a position sensor, if the motor moves on its own (spontaneously) in a state where control is not performed by the motor control device as described above, the motor control device cannot detect the movement of the motor, and the deviation cannot be corrected (the deviation cannot be detected).

For example, when the actuator is used for driving a flap of an in-vehicle air conditioner, the above-described problem can be described as follows. That is, when the flap reaches the end stop so as to stop, if the actuator spontaneously moves reversely, the force of the flap pressing the end stop weakens. Therefore, even when the flap is configured to be closed at the end stop, the position of the flap spontaneously separates away from the end stop, and the flap cannot be maintained in a completely closed state. Also, if the actuator is separated from the end stop, even though the motor is controlled, there is a possibility that the position management will be deviated, and in the subsequent operation, the position of the flap cannot be controlled appropriately.

The present invention has been made in view of the above circumstances, and an object of the present invention is to provide a motor control device and a control method of a stepping motor which are capable of preventing the motor from spontaneously rotating in a rotation direction reverse to a previous rotation direction after the motor becomes out of step to stop.

According to an illustrative embodiment of the present invention, there is provided a motor control device controlling an energizing state of a coil of each phase for driving a stepping motor having multiple phase coils. The motor control device includes a detecting unit configured to detect whether the stepping motor is out of step, and a reverse rotating unit configured, when the detecting unit detects that the stepping motor is out of step, to rotate the stepping motor in a second rotation direction reverse to a first rotation direction, which is a rotation direction of the stepping motor before detecting out-of-step, by a number of steps with which a stress received by the stepping motor is alleviated, before the stepping motor spontaneously rotates in the second direction.

The above motor control device may further include a re-driving unit configured to drive the stepping motor in the first rotation direction again after a rotation operation in the second rotation direction by the reverse rotating unit finishes.

In the above motor control device, when driving the stepping motor in the first rotation direction, the re-driving unit may be configured to drive the stepping motor while the detecting unit detects whether the stepping motor is out of step.

In the above motor control device, when driving the stepping motor in the first rotation direction, the re-driving unit may be configured to drive the stepping motor by a torque smaller than a normal torque during a previous rotation in the first rotation direction.

In the above motor control device, when driving the stepping motor in the first rotation direction, the re-driving unit may be configured to drive the stepping motor by a torque in a range from 50% to 90% of a normal torque during a previous rotation in the first rotation direction.

In the above motor control device, when driving the stepping motor in the first rotation direction, the re-driving unit may be configured to drive the stepping motor by an amount of driving which is smaller than an amount of driving in the second rotation direction by the reverse rotating unit.

The motor control device may further include an acquiring unit configured to acquire temperature information on a temperature of the stepping motor or a temperature corresponding to the temperature of the stepping motor, and the detecting unit may be configured to detect whether the stepping motor is out of step based on a detection reference for detecting out-of-step of the stepping motor according to the temperature information acquired by the acquiring unit.

According to another illustrative embodiment of the present invention, there is provided a control method of a stepping motor having multiple phase coils. The control method includes detecting whether the stepping motor is out of step, and when it is detected that the stepping motor is out of step, rotating the stepping motor in a second rotation direction reverse to a first rotation direction, which is a rotation direction of the stepping motor before detecting out-of-step, by a number of steps with which a stress received by the stepping motor is alleviated, before the stepping motor spontaneously rotates in the second direction.

According to the above-described configuration, when it is detected that the stepping motor having rotated in the first rotation direction is out of step, after this detection, before the stepping motor spontaneously rotates in the second rotation direction reverse to the first rotation direction, the stepping motor rotates in the second rotation direction by a number of steps with which the stress received by the stepping motor is alleviated. Therefore, it is possible to provide the motor control device and the control method of the stepping motor which are capable of preventing the motor from spontaneously rotating in a rotation direction reverse to a previous rotation direction after the motor becomes out of step to stop.

DETAILED DESCRIPTION

Hereinafter, a motor control device according to an illustrative embodiment of the present invention will be described.

The motor control device is, for example, configured to drive a stepping motor having multiple phase coils. The motor control device controls an energizing state of a coil of each phase for driving the stepping motor. In the present illustrative embodiment, the motor control device includes a drive circuit for energizing the coils of the stepping motor, and a control circuit for controlling the drive circuit. In other words, a portion of the motor control device configures the control circuit.

The motor control device and the stepping motor which is driven by the motor control device configure an actuator. In the actuator, the stepping motor is driven by driving power supplied based on electric power supplied from a power source by the drive circuit. In the actuator, the drive circuit is controlled by the control circuit, so that driving of the stepping motor is controlled.

[Illustrative Embodiment]

Figure 1:
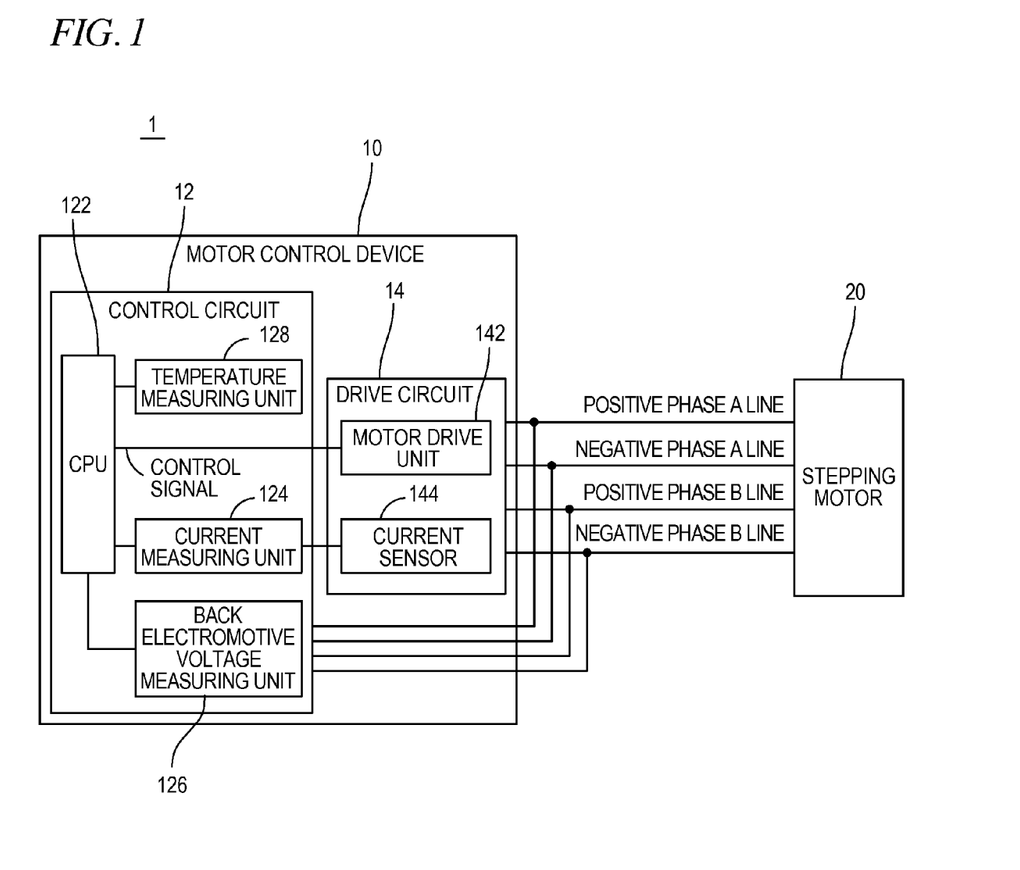
FIG. 1 is a block diagram showing a configuration of an actuator according to an illustrative embodiment of the present invention.

FIG. 1 is a block diagram showing a configuration of an actuator according to an illustrative embodiment of the present invention.

As shown in FIG. 1, an actuator 1 includes a motor control device 10, a stepping motor 20, a gear box (not shown), and a casing (not shown) for accommodating them. The stepping motor 20 is driven, for example, by two-phase excitation of phase A and phase B. The stepping motor 20 includes a coil of the phase A and a coil of the phase B (shown in FIG. 2). Electric power is supplied from the motor control device 10 to the coils of each phase, whereby the stepping motor 20 is driven. The stepping motor 20 is used, for example, as an actuator for an air conditioner mounted in a vehicle. Incidentally, the usage of the stepping motor 20 and the actuator 1 are not limited thereto.

The motor control device 10 includes a control circuit 12 and a drive circuit 14.

The drive circuit 14 includes a motor drive unit 142 and a current sensor 144. The drive circuit 14 supplies electric power to the stepping motor 20, thereby driving the stepping motor 20.

The control circuit 12 includes a CPU (central processing unit) (an example of a detecting unit and an example of a re-driving unit) 122, a current measuring unit 124, a back electromotive voltage measuring unit (an example of a measuring unit) 126, and a temperature measuring unit (an example of an acquiring unit) 128. The control circuit 12 controls the drive circuit 14 to control driving of the stepping motor 20. In the present illustrative embodiment, the control circuit 12 is packaged as an IC (integrated circuit).

The motor drive unit 142 is a module for applying voltage to the coil of the each phase of the stepping motor 20. The motor drive unit 142 receives a control signal from the CPU 122. The motor drive unit 142 applies the voltage based on the control signal. In the present illustrative embodiment, the drive circuit 14 and the stepping motor 20 are connected by four lines, that is, a positive phase A line, a negative phase A line, a positive phase B line, and a negative phase B line. The motor drive unit 142 supplies electric power to the stepping motor 20 through those lines based on the control signal.

The current sensor 144 is a module for sensing current (a coil current) flowing in a coil of the each phase of the stepping motor 20. The current sensor 144 outputs the sensing result of the coil current to the current measuring unit 124.

The current measuring unit 124 is a module for measuring the coil current of the stepping motor 20. The current measuring unit 124 receives the sensing result of the coil current output from the current sensor 144. The current measuring unit 124 measures the coil current based on the received sensing result. The current measuring unit 124 outputs the measuring result of the coil current to the CPU 122.

The back electromotive voltage measuring unit 126 is a module for measuring a back electromotive voltage induced in the coil of the each phase of the stepping motor 20. In the present illustrative embodiment, the back electromotive voltage measuring unit 126 is connected to each of the four lines connecting the drive circuit 14 and the stepping motor 20. The back electromotive voltage measuring unit 126 outputs the measuring result of the back electromotive voltage to the CPU 122.

The temperature measuring unit 128 is, for example, a temperature sensor for measuring the temperature of the IC of the control circuit 12. The temperature measuring unit 128 outputs temperature information representing the temperature of the control circuit 12 to the CPU 122.

The CPU 122 receives the measuring result of the coil current output from the current measuring unit 124, the measuring result of the back electromotive voltage output from the back electromotive voltage measuring unit 126, and the temperature information output from the temperature measuring unit 128. The CPU 122 generates the control signal for controlling a voltage applied to the stepping motor 20. The CPU 122 generates the control signal based on the measuring result of the coil current when driving the stepping motor 20. The CPU 122 outputs the generated control signal to the motor drive unit 142.

Figure 2:
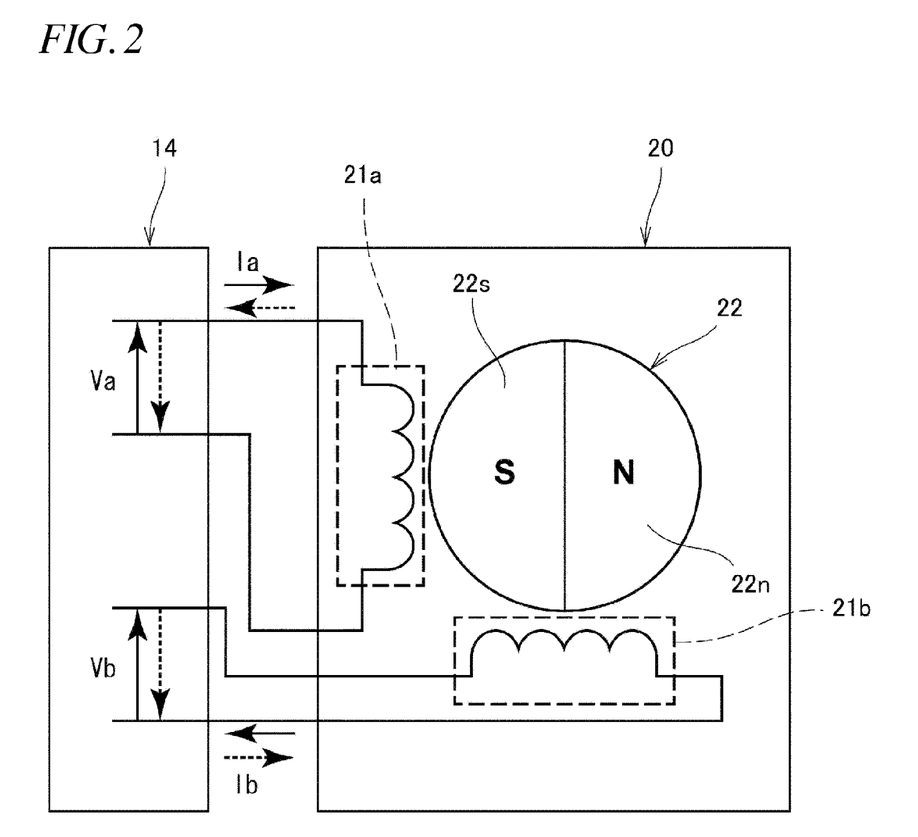
FIG. 2 is a view schematically showing a circuit configuration of a stepping motor.

FIG. 2 is a view schematically showing a circuit configuration of the stepping motor 20.

As shown in FIG. 2, the stepping motor 20 includes two coils 21a and 21b, a rotor 22, and a plurality of stator yokes (not shown).

Each of the coils 21a and 21b is a coil for exciting the stator yokes. Each of the coils 21a and 21b is connected to the drive circuit 14. The coil 21a is the coil of the phase A. The coil 21b is the coil of the phase B. In the coils 21a and 21b, coil currents of different phases flow, respectively.

The rotor 22 includes a multi-pole permanent magnet magnetized such that a south pole 22s and a north pole 22n are alternately reversed. Also, in FIG. 2, the rotor 22 is simply shown to include one south pole 22s and one north pole 22n. The stator yokes are disposed around the rotor 22 close to the periphery of the rotor 22. The phases of the coil currents flowing in the coils 21a and 21b are periodically switched, whereby the rotor 22 rotates.

In the present illustrative embodiment, when the stepping motor 20 is driven, the CPU 122 and the motor drive unit 142 apply a pulse voltage subjected to pulse width modulation to each of the coils 21a and 21b.

The stepping motor 20 is driven as follows. That is, a pulse voltage (a coil voltage $V_a$) is applied to the coil 21a such that the polarity of a coil current $I_a$ (that is, the direction of the coil current $I_a$) varies in a predetermined cycle. Meanwhile, a pulse voltage (coil voltage $V_b$) is applied to the coil 21b in the same cycle as that of the coil 21a. The pulse voltage is applied to the coil 21b such that the polarity of a coil current $I_b$ (that is, the direction of the coil current $I_b$) varies later than the coil current $I_a$ by a predetermined phase.

If the coil currents $I_a$ and $I_b$ flow in the coils 21a and 21b, respectively, the stator yokes of the coils 21a and 21b are excited according to the polarities of the coil currents $I_a$ and $I_b$. As a result, the rotor 22 rotates in a predetermined step unit.

Here, the motor control device 10 performs a process of driving the stepping motor 20 as will be described below. The driving process includes an out-of-step detecting process and a post out-of-step-detection process.

Figure 3:
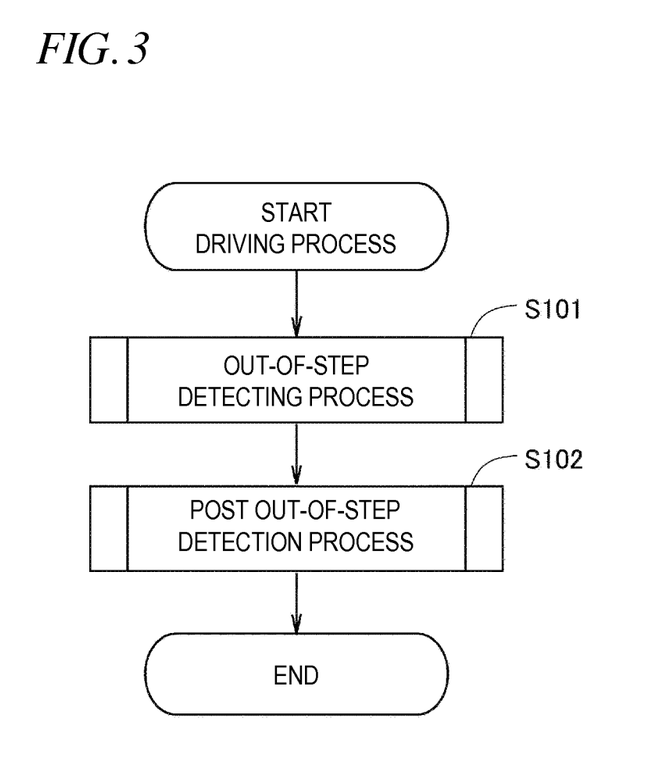
FIG. 3 is a flow chart explaining a process of driving a stepping motor which a motor control device performs.

FIG. 3 is a flow chart explaining the process of driving the stepping motor 20 which the motor control device 10 performs.

Referring to FIG. 3, in a Step S101, the motor control device 10 performs a process (an out-of-step detecting process) of detecting whether out-of-step of the stepping motor 20 occurs (whether the stepping motor 20 is out of step) by an out-of-step detecting method as will be described below. The CPU 122 uses the respective units of the control circuit 12 to perform processes, whereby the out-of-step detecting process is implemented. The out-of-step detecting process finishes when it is detected that out-of-step of the stepping motor 20 occurs as will be described below, and then the process of a Step S102 is performed.

In the Step S102, the post out-of-step-detection process is performed. According to the present illustrative embodiment, in the post out-of-step-detection process, the stepping motor 20 is not stopped immediately after the out-of-step detection, but a predetermined process is performed. Therefore, it is possible to prevent the actuator 1 (not shown) from spontaneously moving after the out-of-step detection. If the Step S102 finishes, a series of operations during occurrence of out-of-step finishes.

First, the out-of-step detecting process will be described.

Whether out-of-step of the stepping motor 20 occurs is detected when the CPU 122 is performing a driving process of driving the stepping motor 20. The driving process is repeated during a time period from when driving of the stepping motor 20 starts to when the driving of the stepping motor 20 stops. The detection is performed based on the back electromotive voltage measured by the back electromotive voltage measuring unit 126, and the temperature information acquired by the temperature measuring unit 128. The detection is performed based on an out-of-step detection reference value (an example of a detection reference) set as will be described.

The flow of the out-of-step detecting method (the out-of-step detecting process) which the CPU 122 performs will be described below.

Figure 4:
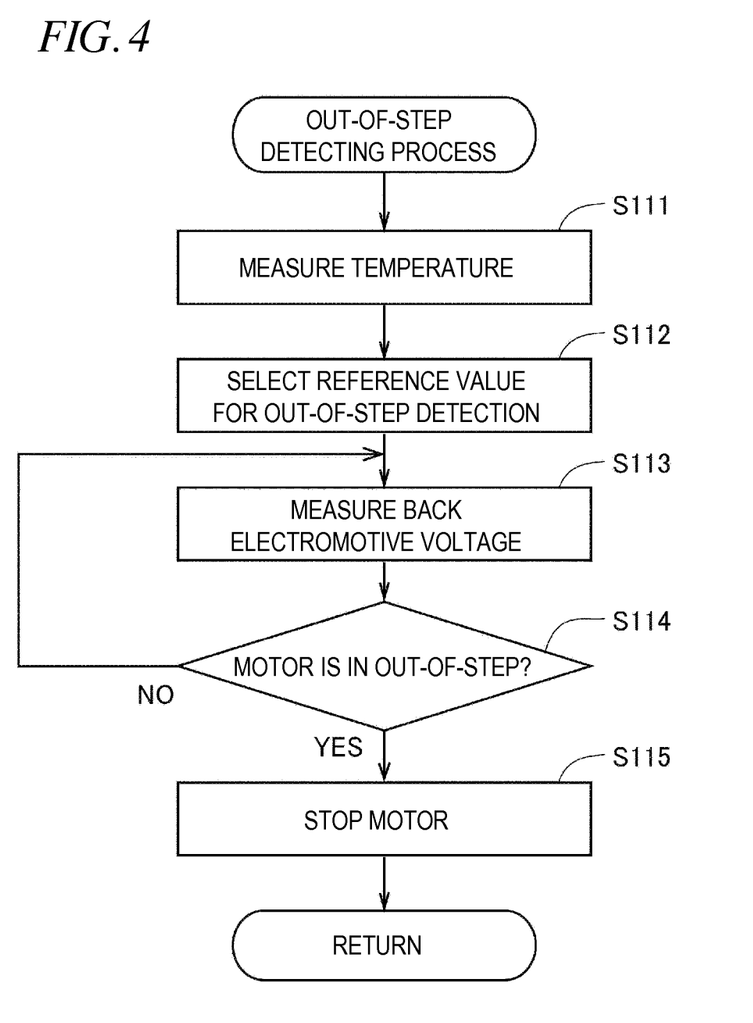
FIG. 4 is a flow chart showing an out-of-step detecting method according to the illustrative embodiment.

FIG. 4 is a flow chart showing the out-of-step detecting method according to the present illustrative embodiment.

As shown in FIG. 4, if the out-of-step detecting process starts, in a Step S111, the CPU 122 controls the temperature measuring unit 128 to measure a temperature. As a result, the temperature information is acquired.

In a Step S112, the CPU 122 selects and sets the out-of-step detection reference value based on the acquired temperature information.

In a Step S113, the CPU 122 controls the back electromotive voltage measuring unit 126 to measure the back electromotive voltage.

In a Step S114, the CPU 122 detects whether the stepping motor 20 is out of step. If it is not detected that the stepping motor 20 is out of step, the CPU 122 repeats the Steps S113 and S114 to measure the back electromotive voltage and detect whether the stepping motor 20 is out of step.

If it is detected in the Step S114 that the stepping motor 20 is out of step, in a Step S115, the CPU 122 performs a process of stopping the stepping motor 20. If the stepping motor 20 stops, the out-of-step detecting process on the stepping motor 20 finishes. Thereafter, the post out-of-step-detection process (to be described below) is performed.

Here, in the above-described process of the Step S113, the back electromotive voltage is measured as follows. When the direction of any one of the coil currents $I_a$ and $I_b$ flowing in the coils 21*a* and 21*b* of phase A and phase B is switched, the CPU 122 temporarily stops application of the pulse voltage to the corresponding coil 21*a* or 21*b* (a stop period). During this stop period, the back electromotive voltage measuring unit 126 measures the back electromotive voltage, induced in the coil 21*a* or 21*b* of the phase to which the pulse voltage is stopped application, separately (for each phase or for each coil).

That is, if the polarity of the coil 21*a* changes, application of the pulse voltage to the coil 21*a* is stopped such that the coil current $I_a$ becomes zero. In this stop period, a back electromotive voltage is induced in the coil 21*a*. Also, if the polarity of the coil 21*b* changes, application of the pulse voltage to the coil 21*b* is stopped such that the coil current $I_b$ becomes zero. In this stop period, a back electromotive voltage is induced in the coil 21*b*. The back electromotive voltage measuring unit 126 measures those back electromotive voltages.

More specifically, during the driving of the stepping motor 20, the pulse voltages are applied to the coils 21*a* and 21*b* according to control of the CPU 122 (PWM control). As a result, the coil currents $I_a$ and $I_b$ flow in the coils 21*a* and 21*b*, respectively.

When the PWM control is performed, thereafter, an energizing stopping process and constant voltage control are performed. For example, when the energizing stopping process is performed on the coil 21*a*, the application of the pulse voltage to the coil 21*a* is stopped for a predetermined stop period. As a result, the coil current $I_a$ becomes zero. The stop period is arbitrarily set by the CPU 122. For example, the CPU 122 may set a predetermined stop period, or may receive setting of the stop period from the outside of the actuator 1. In this stop period, the back electromotive voltage measuring unit 126 measures the back electromotive voltage induced in the coil 21*a*. The measured result is supplied to the CPU 122.

Also, in the present illustrative embodiment, when the energizing stopping process is performed on the coil 21*a* as described above, in the stop period, the CPU 122 sets the coil voltage $V_b$ of the coil 21*b* to a fixed voltage as the constant voltage control. That is, in the stop period, the CPU 122 sets every coil other than the coil from which the back electromotive voltage is measured, to the fixed voltage in the stop period. A voltage level of the fixed voltage may be the same voltage level (for example, a power supply voltage level, a ground (GND) level, or the like) as that of the previous coil voltage, or may be a predetermined reference voltage level. Therefore, for example, when the energizing stopping process is performed on the coil 21*a*, the coil voltage $V_b$ of the coil 21*b* becomes constant (in the present illustrative embodiment, for example, the power supply voltage level).

When the voltage level of the fixed voltage is the power supply voltage level, the coil current $I_b$ of the coil 21*b* when the power-supply stopping process is performed on the coil 21*a* slightly rises as compared to the coil current $I_b$ flowing in the period when the above-described PWM control is being performed. In the stop period, since the coil voltage $V_b$ is constant, noise is not caused by application of the coil voltage $V_b$. Therefore, in the stop period, noise is not superimposed on the coil voltage $V_a$ of the coil 21*a*. Accordingly, the back electromotive voltage induced in the coil 21*a* can be accurately measured by measuring the coil voltage $V_a$ in the stop period. Therefore, erroneous detection of out-of-step can be prevented.

If the back electromotive voltage is measured as described above, in the Step S114, the CPU 122 determines whether the back electromotive voltage satisfies a predetermined out-of-step detection reference, that is, the out-of-step detection reference value set in the Step S112. In other words, the CPU 122 compares the acquired back electromotive voltage value with the out-of-step detection reference value. According to the comparison result, it can be detected whether out-of-step of the stepping motor 20 occurs. For example, if the measured back electromotive voltage value reaches the out-of-step detection reference value, the CPU 122 detects that out-of-step of the stepping motor 20 occurs.

Subsequently, setting of the out-of-step detection reference based on the temperature information will be described.

In the present illustrative embodiment, before detecting whether the stepping motor 20 is out of step, the out-of-step detection reference value is set based on the temperature information in the Steps S111 and S112. Then, based on the set out-of-step detection reference value, it is detected whether the stepping motor 20 is out of step.

It is known that the back electromotive voltage of the stepping motor 20 depends on the temperature of the stepping motor 20. Therefore, the temperature information of the stepping motor 20, and the temperature information of the motor control device 10 corresponding to the temperature of the stepping motor 20 are used to set the out-of-step detection reference value. The motor control device 10 is often placed under the same environment as that of the stepping motor 20. Also, the motor control device 10 operates according to the operation of the stepping motor 20. Therefore, the temperature of the motor control device 10 corresponds to the temperature of the stepping motor 20. If that temperature information is used to set the out-of-step detection reference value, detection of out-of-step can be more accurately detected.

In the present illustrative embodiment, more specifically, the temperature measuring unit 128 acquires the temperature of the control circuit 12, that is, internal temperature of the IC, as the temperature information. Here, the control circuit 12 is often placed under the substantially same environment as that of the stepping motor 20. Also, the control circuit 12 operates according to the operation of the stepping motor 20. Therefore, the internal temperature of the IC substantially correlates with an environment (a situation such as an ambient temperature) in which the stepping motor 20 is placed, and the load status of the stepping motor 20. Therefore, if the temperature information on the internal temperature of the IC is used to select the out-of-step detection reference value according to the temperature, it can be more accurately detected whether the stepping motor 20 is out of step.

If the temperature information is acquired by the temperature measuring unit 128, according to that temperature information, the CPU 122 sets the out-of-step detection reference value. In the present illustrative embodiment, the CPU 122 determines which of three predetermined temperature ranges (temperature ranges of three ranks) the temperature represented by the temperature information acquired by the temperature measuring unit 128 belongs to. Then, the CPU 122 sets a reference value (threshold value) associated in advance with one of the three temperature ranges to which the temperature represented by the temperature information is determined to belong, as the out-of-step detection reference value. For example, the correspondence relation between each temperature range and a reference value is set as a reference value set table in advance. The reference value set table is stored, for example, in a storage unit (a memory) (not shown) provided in the control circuit 12. Incidentally, the correspondence relation may not be determined based on that reference value set table.

In the present illustrative embodiment, as the three temperature ranges, for example, three ranges, that is, a first range equal to or lower than 5° C., a second range higher than 5° C. and lower than 75° C., and a third range equal to or higher than 75° C. are set. Further, the first range, the second range, and the third range are associated with reference values $V_1$, $V_2$, and $V_3$ set as the out-of-step detection reference value, respectively.

The CPU 122 determines which of the three temperature ranges (the first to third ranges) the temperature represented by the temperature information acquired by the temperature measuring unit 128 belongs to. Then, the CPU 122 selects the reference value associated with the range to which the temperature represented by the temperature information has been determined to belong, and sets the selected reference value as the out-of-step detection reference value.

For example, it is assumed that the temperature represented by the temperature information acquired by the temperature measuring unit 128 is 50° C. In this case, the temperature belongs to the second range. Therefore, the reference value $V_2$ associated with the second range is set as the out-of-step detection reference value. The CPU 122 compares the set out-of-step detection reference value $V_2$ with the back electromotive voltage value, thereby detecting whether out-of-step of the stepping motor 20 occurs.

Similarly, when the temperature represented by the temperature information acquired by the temperature measuring unit 128 is, for example, 0° C., the reference value $V_1$ is set as the out-of-step detection reference value. Also, when the temperature is, for example, 100° C., the reference value $V_3$ is selected as the out-of-step detection reference value. In this way, based on the out-of-step detection reference value corresponding to the temperature of the stepping motor 20, it can be detected whether out-of-step of the stepping motor 20 occurs.

Incidentally, the temperature range may be divided into at least two ranges of the high temperature side and the low temperature side, or may be divided into four or more ranges. The temperature range may be divided into five, for example, a range equal to or lower than 5° C., a range of 5° C. to 45° C., a range of 45° C. to 60° C., a range of 60° C. to 75° C., and a range equal to or higher than 75° C., or may be divided into seven or more.

In the present illustrative embodiment, as described above, the temperature corresponding to the temperature of the stepping motor 20 is measured. Further, according to the temperature acquired by the measuring, the out-of-step detection reference value is set. Then, the set out-of-step detection reference value is compared with the separately measured back electromotive voltage, whereby out-of-step is detected. The back electromotive voltage of the stepping motor 20 depends on temperature. In the motor control device 10, the out-of-step detection reference value which is a reference for the back electromotive voltage at that detection timing is changed according to the temperature of the stepping motor 20, thus out-of-step is detected. Therefore, even in a state where the stepping motor 20 is at a comparatively high temperature or at a low temperature, occurrence of out-of-step of the stepping motor 20 can be detected with a high degree of accuracy.

The out-of-step detection reference value is set by selecting a reference value associated in advance with a temperature range to which the temperature represented by the temperature information belongs. Therefore, the out-of-step detection reference value can be set by a comparatively simple process.

Also, in the present illustrative embodiment, the temperature measured by the temperature measuring unit 128 provided inside the control circuit 12 is used to set the out-of-step detection reference value. Since a "function of measuring the internal temperature of an IC" which has been used inside a control circuit 12 for motor control in the related-art technique is used, the number of components of the motor control device 10 can be reduced. Accordingly, the manufacturing cost of the motor control device 10 can be kept low. Also, the motor control device 10 can have smaller size, and therefore, a space necessary to install the motor control device 10 can be reduced. The internal temperature of the IC substantially correlates with an environment (an ambient temperature) in which the stepping motor 20 is placed, and the load status of the stepping motor 20. Since the temperature information on the internal temperature of the IC is used to set the out-of-step detection reference value according to the temperature, out-of-step can be more accurately detected.

In the above illustrative embodiment, the temperature is measured by the temperature measuring unit 128 provided inside the control circuit 12; however, the present invention is not limited thereto. For example, separate sensors may be used to measure the temperature of the stepping motor 20, the temperature of the motor control device 10 or a temperature corresponding to that temperature.

Here, each temperature range may be associated with one reference value as described above, or may be associated with two or more reference values. For example, when a plurality of reference values are used to set the out-of-step detection reference, each reference value may be obtained by a reference value set table.

Figure 5:
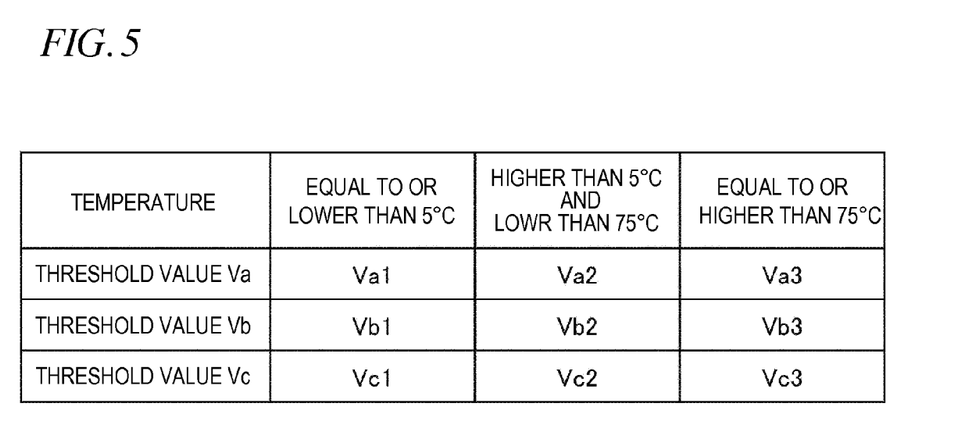
FIG. 5 is a view showing an example of a reference value set table.

FIG. 5 is a view showing an example of the reference value set table.

In FIG. 5 also, three temperature ranges, that is, the first range equal to or lower than 5° C., the second range higher than 5° C. and lower than 75° C., and the third range equal to or higher than 75° C. are set. With respect to each temperature range, three reference values (threshold values $V_a$, $V_b$, and $V_c$) are set.

Here, the threshold values $V_a$, $V_b$, and $V_c$ are, for example, as follow. That is, the threshold value $V_a$ is for comparison with the measured back electromotive voltage value. Also, the threshold value $V_b$ is for comparison with the absolute value of a change value in the back electromotive voltage between consecutive measuring points. The threshold value $V_c$ is for comparison with a difference between the absolute values of change values in the back electromotive voltage in a period when the back electromotive voltage changes such that consecutive change values satisfy a predetermined condition.

These threshold values $V_a$, $V_b$, and $V_c$ are used to set the out-of-step detection reference. That is, for example, as disclosed in JP-A-2009-261045, if any one of a plurality of conditions including a condition that the measured back electromotive voltage value should satisfy a predetermined condition with respect to the threshold value $V_a$, a condition that the absolute value of a change value of the back electromotive voltage should satisfy a predetermined condition with respect to the threshold value $V_b$, a condition that a difference between the absolute values of change values in the back electromotive voltage should satisfy a predetermined condition with respect to the threshold value $V_c$, and so on is satisfied, it may be determined that the out-of-step detection reference is satisfied. Also, if a predetermined number of (for example, two or more) conditions of the plurality of conditions including them are satisfied, or all of two or more specific conditions are satisfied, it may be determined that the out-of-step detection reference is satisfied.

In the example shown in FIG. 5, in the reference value set table, the first range is associated with threshold values $V_{a1}$, $V_{b1}$, and $V_{c1}$ serving as the three threshold values $V_a$, $V_b$, and $V_c$, respectively. Also, the second range is associated with threshold values $V_{a2}$, $V_{b2}$, and $V_{c2}$. The third range is associated with threshold values $V_{a3}$, $V_{b3}$, and $V_{c3}$. The CPU 122 selects each of the threshold values $V_a$, $V_b$, and $V_c$ associated with a temperature range to which the temperature represented by the temperature information acquired by the temperature measuring unit 128 has been determined to belong, and sets the selected threshold values as the out-of-step detection references. Therefore, even when comparatively complex out-of-step detection references are used to perform detection of out-of-step, the out-of-step detection reference can be appropriately changed according to the measured temperature. If the reference value set table is used, the out-of-step detection reference can be set by a comparatively simple process.

Incidentally, the CPU 122 is not limited to employ the above-described method of selecting a reference value associated with a temperature range, and may be configured to set the out-of-step detection reference by various methods. For example, the CPU 122 may be configured to use an equation with temperature as a parameter to obtain the out-of-step detection reference value.

For example, like the following equation, the out-of-step detection reference value V may be expressed by a function F(t) with the internal temperature t of the IC as a parameter, and this function F(t) may be used to obtain the out-of-step detection reference value V.

$$V=F(t)$$

Specifically, for example, a mathematical expression expressed like the following equation can be used to obtain the out-of-step detection reference value V.

$$V=a \times t^2 + b \times t + c \quad (a, b, \text{ and } c \text{ are constants})$$

The above equation is a mere example, and the function F(t) may be expressed as a high-dimensional function of an order higher than the second order.

If an equation according to the dependency of the back electromotive voltage on the temperature is used to set the out-of-step detection reference value as described above, the out-of-step detection reference value can be set more adapting to a change in the temperature. Therefore, it can be more accurately detected whether out-of-step of the stepping motor 20 occurs. Therefore, it can be more surely detected whether the stepping motor 20 is out of step.

Subsequently, the post out-of-step-detection process will be described.

In the present illustrative embodiment, for example, when the actuator reaches an end stop and out-of-step of the stepping motor 20 occurs, the post out-of-step-detection process is performed such that the actuator immediately moves reversely (a direction away from the end stop) and then the stepping motor 20 stops, whereby the motor can be prevented from spontaneously moving reversely.

Figure 6:
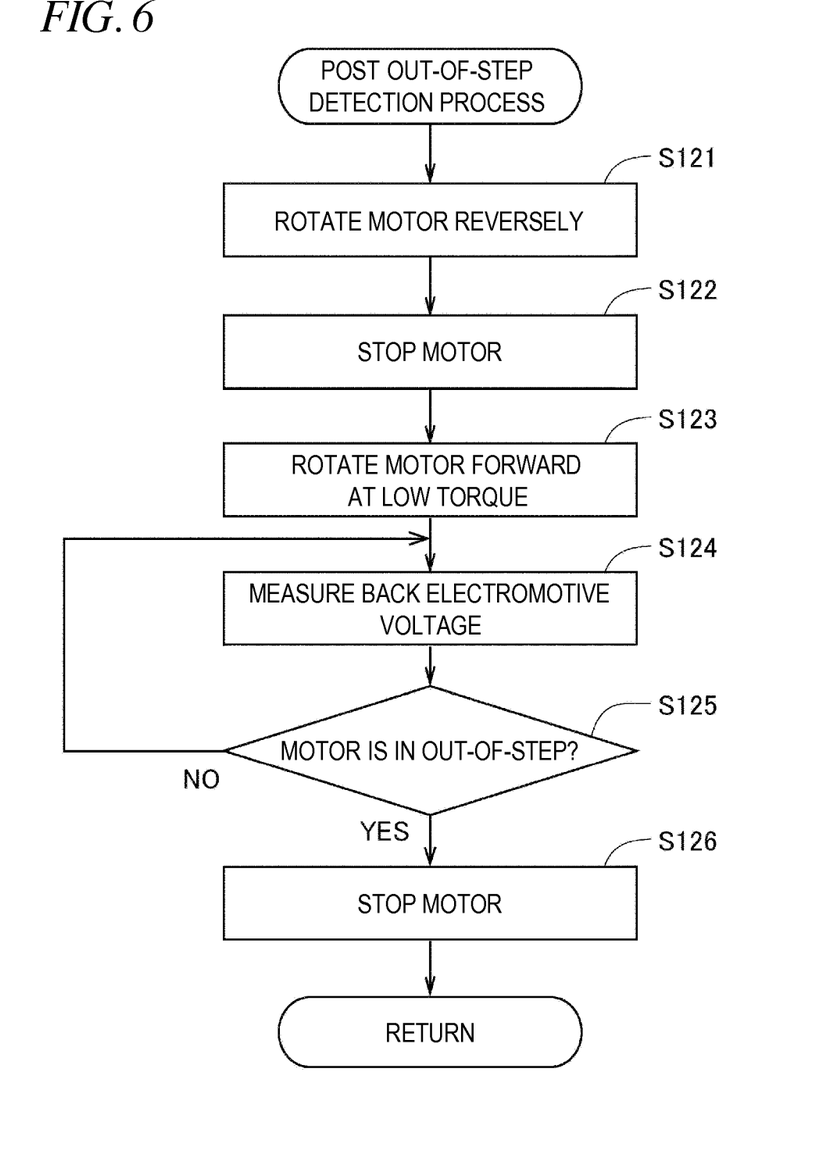
FIG. 6 is a flow chart showing a post out-of-step-detection process according to the illustrative embodiment.

FIG. 6 is a flow chart showing the post out-of-step-detection process according to the present illustrative embodiment.

As shown in FIG. 6, if the post out-of-step-detection process starts, the process is performed from a Step S121. That is, if the CPU 122 detects that the stepping motor 20 is out of step, the stepping motor 20 is stopped in the Step S115, and then the post out-of-step-detection process is performed from the Step S121.

In the Step S121, the CPU 122 starts control such that the stepping motor 20 rotates in the rotation direction (a second rotation direction) reverse to the previous rotation direction (a forward rotation direction; a first rotation direction).

In a Step S122, the CPU 122 stops the stepping motor 20.

In a Step S123, the CPU 122 starts to rotate the stepping motor 20 forward again.

This control for rotating the stepping motor 20 forward again is performed while it is detected whether the stepping motor 20 is out of step. For example, the detection of out-of-step may be performed as described above. That is, in a Step S124, the CPU 122 controls the back electromotive voltage measuring unit 126 to measure the back electromotive voltage.

In a Step S125, the CPU 122 detects whether the stepping motor 20 is out of step. If it is not detected that the stepping motor 20 is out of step, the CPU 122 repeats the Steps S124 and S125 so as to measure the back electromotive voltage and detect whether the stepping motor 20 is out of step. Also, at this time, the number of steps by which the stepping motor is rotated forward again may be set to be in a range less than the number of steps during the reverse rotation. Therefore, the actuator can be prevented from reaching the end stop again with a strong strain.

If it is detected in the Step S125 that the stepping motor 20 is out of step, in a Step S126, the CPU 122 performs a process of stopping the stepping motor 20. If the stepping motor 20 stops, the post out-of-step-detection process finishes. That is, the process of driving the stepping motor 20 finishes.

Figure 7:
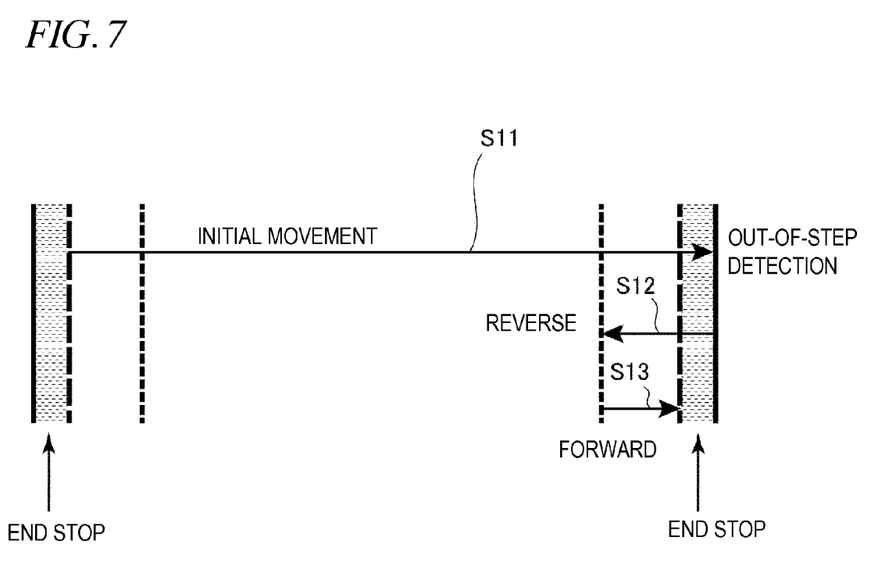
FIG. 7 is a view explaining the post out-of-step-detection process.

FIG. 7 is a view explaining the post out-of-step-detection process.

With reference to FIG. 7, the operation of the stepping motor 20 in the above-described post out-of-step-detection process will be described. For example, the operation of the actuator during initial movement is assumed. First, when the stepping motor 20 is rotating in a predetermined rotation direction in a Step S11, if the actuator 1 reaches an end stop, out-of-step is detected. Then, the stepping motor 20 is stopped, and then the stepping motor 20 rotates reversely in a Step S12 ("REVERSE"). Thereafter, the stepping motor 20 stops. Next, in a Step S13 ("FORWARD"), the stepping motor 20 rotates forward again. Then, if out-of-step of the stepping motor 20 is detected, the stepping motor 20 stops.

It is noted that the above-described process of the Step S121 to reversely rotate the stepping motor 20 (the Steps S11 and S12 in FIG. 7) starts after it is detected that the stepping motor 20 is out of step but before the stepping motor 20 spontaneously moves in the rotation direction reverse to the previous forward rotation direction. That is, if the actuator 1 reaches the end stop, and out-of-step is detected, the motor stops. In this state, due to the torque of the stepping motor 20, a strain (repulsive force to act reversely) is generated inside the actuator 1. This strain is transmitted as a stress to the stepping motor 20. The stepping motor 20 may be not able to withstand the stress, so that the stepping motor 20 start moving, and the actuator 1 may spontaneously start moving reversely. It is known that a time necessary for the actuator 1 (the stepping motor 20) to spontaneously start moving is different depending on temperature but is about 4 msec to 300 msec from when out-of-step is detected. Therefore, the process of the Step S121 needs to reversely rotate the motor at the latest within 300 msec after it is detected that the stepping motor is out of step. Accordingly, the internal strain of the actuator 1 can be alleviated (released) before the actuator spontaneously starts moving.

Also, in the above-described processes of the Steps S121 and S122, the CPU 122 reversely rotates the stepping motor 20 by the number of steps by which the internal strain of the actuator 1 can be alleviated, and then stops the stepping motor 20. This number of steps may be appropriately set. For example, the stepping motor 20 may be reversely rotated by the number of steps corresponding to rotation of the output shaft of the stepping motor 20 in a range from 0.5° to 3°.

Also, as the internal strain of the actuator 1, an appropriate member capable of being taken into account may be set according to the configuration of the actuator 1. For example, in view of not only the strain of the output shaft of the actuator 1 but also the strains of other mechanical components such as gears, the number of steps may be set such that the internal strain is alleviated.

Here, the above-described process of the Step S123 to rotate the stepping motor 20 forward again (the Step S13 in FIG. 7) is effective if the stepping motor 20 is driven by a torque of a range from 50% to 90% of the torque (normal torque) during the previous forward rotation (shown in the Step S11 in FIG. 7). If the stepping motor 20 is driven by a low torque as described above, when out-of-step is thereafter detected, and the stepping motor 20 stops, the internal strain of the actuator 1 is reduced as the torque decreases. Therefore, after the stepping motor stops again, spontaneous reverse movement can be prevented, and thus the actuator 1 can be appropriately controlled.

[Others]

In the post out-of-step-detection process, when the stepping motor is reversely rotated and then is rotated forward, the detection of whether the stepping motor is out of step may not be performed, and the number of steps (an amount of driving) by which the stepping motor is rotated forward again may be set to be in a range smaller than the number of steps during the reverse rotation. For example, when the stepping motor is moved reversely by 30 steps, thereafter, the stepping motor may be moved forward by 10 steps. This control makes it possible to surely move the stepping motor to a position where the stepping motor does not reach the end stop again with a strong strain, while preventing out-of-step from occurring.

In a stop period of a control current of a coil of each phases, the other coil is set to a fixed voltage, and the back electromotive voltage is measure. However, the present invention is not limited thereto. In a stop period of a control current of a coil of a phase, the back electromotive voltage relative to the corresponding coil may be measured regardless of whether the other coil is set to a fixed voltage. Also, the back electromotive voltage may be appropriately measured at various timings.

Only a portion of the control circuit may be configured as an integrated circuit. Also, a portion of a part of the motor control device different from the control circuit may be configured as an integrated circuit. The whole of the motor control device may be configured as an integrated circuit.

The stepping motor is not limited to a two-phase motor. For example, the stepping motor may be a five-phase motor.

A hardware configuration of the actuator such as the stepping motor and the motor control device is not limited to the above-described configuration. The configuration of the actuator can be appropriately changed such that the motor control device performs out-of-step detecting process and the post out-of-step-detection process as described above.

The above-described processes according to the illustrative embodiment may be performed by software, or may be performed by a hardware circuit.

It is also possible to provide a program for performing the above-described processes according to the illustrative embodiment, and the corresponding program may be recorded in recording media such as a CD-ROM, a flexible disk, a hard disk, a ROM, a RAM, and a memory card to provide to users. The corresponding program may be downloaded to an apparatus through a communication line such as the Internet. The processes described in sentences in the above-described flow charts may be performed according to the corresponding program by the CPU or the like.

It should be understood that the illustrative embodiment disclosed herein is illustrative and non-restrictive in every respect. The scope of the present invention is defined by the terms of the claims, rather than the description above, and is intended to include any modifications within the scope and meaning equivalent to the terms of the claims.

What is claimed is:

1. A motor control device controlling an energizing state of a coil of each phase for driving a stepping motor having multiple phase coils, the motor control device comprising:
   a drive circuit that drives the stepping motor,
   a control circuit that controls the drive circuit; and
   wherein the drive circuit and the control circuit collaboratively operates to:
   detect whether the stepping motor is out-of-step; and
   when the out-of-step of the stepping motor is detected, rotate the stepping motor in a second rotation direction reverse to a first rotation direction that is a rotation direction of the stepping motor before detecting the out-of-step, by a number of steps with which a stress received by the stepping motor is alleviated, to prevent spontaneous rotation of the stepping motor in the second direction.

2. The motor control device according to claim 1, wherein the drive circuit and the control circuit further collaboratively operate to:
drive the stepping motor in the first rotation direction again after completing to drive the stepping motor in the second rotation direction.

3. The motor control device according to claim 2, wherein the drive circuit and the control circuit further collaboratively operate to:
when driving the stepping motor in the first rotation direction, drive the stepping motor while detecting whether the stepping motor is out-of-step.

4. The motor control device according to claim 2, wherein the drive circuit and the control circuit further collaboratively operates to:
when driving the stepping motor in the first rotation direction, drive the stepping motor by a torque smaller than a normal torque during a previous rotation in the first rotation direction.

5. The motor control device according to claim 2, wherein the drive circuit and the control circuit further collaboratively operates to:
when driving the stepping motor in the first rotation direction, drive the stepping motor by a torque in a range from 50% to 90% of a normal torque during a previous rotation in the first rotation direction.

6. The motor control device according to claim 2, wherein the drive circuit and the control circuit further collaboratively operate to:
when driving the stepping motor in the first rotation direction, drive the stepping motor by an amount of driving which is smaller than an amount of driving in the second rotation direction.

7. The motor control device according to claim 1, wherein the controller unit comprises an acquiring unit configured to acquire temperature information on a temperature of the stepping motor or a temperature corresponding to the temperature of the stepping motor, wherein the drive circuit and the control circuit further collaboratively operate to:
detect whether the stepping motor is out-of-step based on a detection reference for detecting the out-of-step of the stepping motor according to the temperature information acquired by the acquiring unit.

8. A control method of a stepping motor having multiple phase coils, the control method comprising:
detecting whether the stepping motor is out-of-step; and
when it is detected that the stepping motor is out-of-step, rotating the stepping motor in a second rotation direction reverse to a first rotation direction, which is a rotation direction of the stepping motor before detecting out-of-step, by a number of steps with which a stress received by the stepping motor is alleviated, to prevent spontaneous rotation of the stepping motor in the second direction.

9. The motor control device according to claim 1, wherein the drive circuit and the control circuit further collaboratively operate to:
measure a back electromotive voltage of the stepping motor; and
detect whether the stepping motor is out-of-step based on the measured back electromotive voltage.

10. The control method of claim 8 further comprising the steps of:
measuring a back electromotive voltage of the stepping motor; and
detecting whether the stepping motor is out-of-step based on the measured back electromotive voltage.

11. A motor control device controlling an energizing state of a coil of each phase for driving a stepping motor having multiple phase coils, the motor control device comprising:
a drive circuit that drives the stepping motor,
a control circuit that controls the drive circuit; and
wherein the drive circuit and the control circuit collaboratively operate to:
detect whether the stepping motor is out-of-step by measuring a back electromotive voltage of the stepping motor and determining if the stepping motor is out-of-step based on the measured back electromotive voltage; and
when the out-of-step of the stepping motor is detected, rotate the stepping motor in a second rotation direction reverse to a first rotation direction that is a rotation direction of the stepping motor before detecting the out-of-step, by a number of steps with which a stress received by the stepping motor is alleviated, before the stepping motor spontaneously rotates in the second direction.

* * * * *